(12) United States Patent
Miller et al.

(10) Patent No.: US 7,149,823 B2
(45) Date of Patent: Dec. 12, 2006

(54) SYSTEM AND METHOD FOR DIRECT MEMORY ACCESS FROM HOST WITHOUT PROCESSOR INTERVENTION WHEREIN AUTOMATIC ACCESS TO MEMORY DURING HOST START UP DOES NOT OCCUR

(75) Inventors: Eddie Miller, Costa Mesa, CA (US); David James Duckman, Costa Mesa, CA (US); Jim Donald Butler, Costa Mesa, CA (US); Daming Jin, Costa Mesa, CA (US); John Sui-Kei Tang, Costa Mesa, CA (US)

(73) Assignee: Emulex Corporation, Costa Mesa, CA (US)

( * ) Notice: Subject to any disclaimer, the term of this patent is extended or adjusted under 35 U.S.C. 154(b) by 257 days.

(21) Appl. No.: 10/651,887

(22) Filed: Aug. 29, 2003

(65) Prior Publication Data
US 2005/0050245 A1 Mar. 3, 2005

(51) Int. Cl.
*G06F 13/28* (2006.01)
*G06F 12/00* (2006.01)

(52) U.S. Cl. ............... 710/22; 710/27; 710/74; 710/305; 710/306; 710/36; 713/1; 713/2

(58) Field of Classification Search ............ 710/22, 710/27, 74, 305, 306, 36; 713/1, 2
See application file for complete search history.

(56) References Cited

U.S. PATENT DOCUMENTS

| 5,918,028 A * | 6/1999 | Silverthorn et al. ......... 710/306 |
| 6,480,933 B1 * | 11/2002 | Cargemel et al. ........... 711/113 |
| 6,519,670 B1 * | 2/2003 | Meiyappan .................. 710/305 |
| 2003/0131166 A1 * | 7/2003 | Utsunomiya et al. ......... 710/74 |
| 2004/0230727 A1 * | 11/2004 | Chen et al. ................. 710/100 |

\* cited by examiner

*Primary Examiner*—Tammara Peyton
(74) *Attorney, Agent, or Firm*—Morrison & Foerster LLP

(57) ABSTRACT

A method and system for allowing a host device (e.g., server) to perform programmed direct accesses to peripheral memory (e.g., flash) located on a peripheral device (e.g., HBA), without the assistance of a microprocessor located on the peripheral device. In a preferred embodiment, new host registers are implemented within controller circuitry of the peripheral device, the host registers being configured to be recognized by host software executed by host. The host device reads and writes to the host registers, which causes appropriate controller hardware to access the peripheral nonvolatile memory accordingly. By creating and implementing the new host registers, an enhanced controller is created that allows a host device to directly access peripheral memory, without peripheral processor assistance.

17 Claims, 5 Drawing Sheets

SYSTEM AND METHOD FOR DIRECT MEMORY ACCESS FROM HOST WITHOUT PROCESSOR INTERVENTION WHEREIN AUTOMATIC ACCESS TO MEMORY DURING HOST START UP DOES NOT OCCUR

BACKGROUND OF THE INVENTION

1. Field of the Invention

The present invention relates to a method and system for accessing a peripheral memory device and, more particularly, to a method and system that allows a host computing device (e.g., server computer) to directly access a peripheral memory device without the assistance of an external processor.

2. Description of the Related Art

Host bus adapters (HBAs) are well-known peripheral devices that handle data input/output (I/O) operations for host devices and systems (e.g., servers). In simple terms, a HBA provides I/O processing and physical connectivity between a host device and external data storage devices. The external storage devices may be connected using a variety of known "direct attached" or storage networking technologies, including Fiber channel, iSCSI, VI/IP, FICON, or SCSI. HBAs provide critical server CPU off-load, freeing servers to perform application processing. HBAs also provide a critical link between storage area networks (SANs) and the operating system and application software residing within the server. In this role the HBA enables a range of high-availability and storage management capabilities, including load balancing, SAN administration, and storage management.

FIG. 1 illustrates a block diagram of a host system 10, which includes a conventional host server 12 that executes application programs 14 in accordance with an operating system program 16. The server 12 also includes necessary driver software 18 for communicating with peripheral devices. The server 12 further includes conventional hardware components 20 such as a CPU (not shown), host memory (e.g., ROM or hard disk drive) (not shown), RAM (not shown), cache (not shown), etc., which are well known in the art.

The server 12 communicates via a peripheral component interconnect (PCI or PCIX) bus interface 22 to a HBA 24, which handles the I/O operations for transmitting and receiving data to and from remote fiber channel disk storage devices 28 via a fiber channel fabric 26. Other host systems 30 may also be "connected" to the fiber channel fabric 26 via respective HBAs 32 in a similar fashion. The server 12 may communicate with other devices 36 and/or clients or users (not shown) via an Ethernet port/interface 38, for example, which can communicate data and information in accordance with well-known Ethernet protocols. Various other types of communication ports, interfaces and protocols are also known in the art that may be utilized by the server 12. The server 12 may also be connected to the Internet 40 via communication port/interface 38 so that remote computers (not shown) can communicate with the server 12 using well-known TCP/IP protocols. Additionally, the server 12 may be connected to local area networks (LANs) (not shown) and/or wide area networks (WANs) (not shown) in accordance with known computer networking techniques and protocols.

FIG. 2 is a block diagram illustrating some core components of a conventional HBA card 24. The HBA 24 includes a plurality of contact pins or slides 25 for making electrical contact to corresponding pins or slides in a PCI or PCIX bus slot (not shown) located on the PCI(X) bus interface 22 (FIG. 1), thereby allowing the server 12 (FIG. 1) to communicate with the HBA 24. The HBA 24 further includes a controller circuit 50 that includes a microprocessor 52 for executing program instructions and processing data stored in volatile memory 54. The HBA card 24 also includes a fiber channel connector/port 54 for establishing a communication link to the fiber channel fabric 26.

In conventional systems, typically, the microprocessor 52 is responsible for operations such as direct memory accesses between the host memory and the HBA. The HBA controls data transfers to and from system memory (e.g., FC Disk 28) without the need for host CPU involvement. Additionally, the microprocessor 52 is responsible for handling other I/O data management and processing operations such as processing context information for each frame of data, routing data to appropriate storage devices 28, etc. These types of functions by the microprocessor 52 and HBA 24 are well-known in the art.

The executable program(s) and data (collectively referred to herein as the "program image") necessary for the microprocessor 52 to perform its various I/O management and handling operations is stored in a nonvolatile memory 56 (e.g., flash memory 56). This program image, or at least portions thereof, is downloaded on an as needed basis from the flash 56, via flash interface device 58 and a flash interface bus 60, to the volatile memory 54 and/or microprocessor 52 cache (not shown) for faster execution and processing by the microprocessor 52.

During normal operation, in order to access (read or write) the flash memory 56, during a host or HBA wake-up process, for example, the microprocessor 52 writes to and sets dedicated registers 62 (referred to herein as μp registers 62) allocated for this purpose. As explained in further detail below with respect to FIG. 5A, the μp registers 62 typically include a read-address register 62a (FIG. 5A), a read-data register 62b, a read-next-data register 62c, a write-address register 62d, a write-data register 62e, and a control/status register 62f. The operation of these registers during access of flash memory is discussed in further detail below.

FIG. 3 illustrates a block diagram of some of the core components or modules of a program image that are downloaded from flash memory 56 to volatile memory 54. As shown in FIG. 3, the program image includes a kernel program or module 70, which is the core or minimum instruction set for the microprocessor 52 to operate and execute other instructions and functions. Such kernel programs are well-known in the art. A basic input/output system (BIOS) program 72 is also stored within the volatile memory 54 for performing HBA component configuration and initialization operations at system start up or wake up. Such BIOS programs are also well-known in the art. The program image further includes a status and error program 74 for monitoring the status of microprocessor 52 operations and reporting an error signal if an error occurs. Such status and error programs are also well-known in the art. The program image also includes one or more executable programs 76 and data 78 for performing its I/O operations as discussed above.

The diagram in FIG. 3 illustrates that different areas of the flash hold different kinds of contents. Generally, there are two types of accesses to flash memory—automatic and programmed. Automatic accesses are carried out because the requesting device needs the information to be functional. In particular, the microprocessor must read instructions from the flash device directly into its instruction-processing pipeline (not copied to any other memory) when it starts processing upon system start up or after a reset is cleared. The "kernel" area contains these instructions. This design relies on information contained in the non-volatile memory to provide a wake-up program for the microprocessor. In a multi-channel HBA, the microprocessor in one channel may be reset and restarted independently of the other microprocessor(s).

The "BIOS" area has another type of automatic access. The host system (server) reads from the flash across the PCI/X bus a program that extends its built-in wake-up program. The program is tailored to the HBA to allow the host system to use the HBA I/O facilities to "boot up," that is, to read extensive control programs from a large external data source. Without this non-volatile "Expansion ROM" the HBA is useless to the host system until the entire host system OS becomes active by booting up over a different external access facility. These automatic direct host-to-flash accesses are known in the art as host ROM base address register (BAR), or ROM BAR, accesses. One disadvantage of host ROM BAR accesses, as discussed in further detail below, is that during these accesses the PCI/X bus is "locked" until the ROM BAR access request is completely satisfied.

The second type of access is a programmed access. In contrast to "automatic" accesses, described above, programmed accesses retrieve data for various uses in accordance with various application programs. Additionally, these programmed accesses can wait (allowing the requesting device to do other things in the interim) on data availability and is, therefore, not "locked" during a pending access request. In prior art systems, programmed accesses were performed by either the HBA microprocessor 52 or the host system, via the PCI/X bus 22, with the assistance by the HBA microprocessor 52.

Typically, during manufacture of the HBA card 24, the program image is "burned" into or programmed into the nonvolatile flash memory 56, before it is implemented on the HBA card 24. Occasionally, an error will occur during programming of the program image such that the microprocessor 52 will not be able to function properly, if at all. Such an error is typically detected during testing of the HBA 24 after it has been assembled. If the error involves the kernel program 70 of the program image, the microprocessor 52 will not function at all and will not be able to assist in reprogramming the flash memory 56. In such an instance, the flash memory 56 must be removed from the HBA card 24 and reprogrammed.

Additionally, even if the kernel program 70 was successfully copied into the flash memory 56, if significant errors occur in programming the other programs 72, 74, 76 and/or 78 into the flash memory 56, the microprocessor 52 will not operate properly. In these instances, as well, the flash memory 56 must be removed from the HBA card 24 and reprogrammed.

Sometimes, one or more programs and/or data of the program image stored in the flash memory 56 can become corrupted during operation of the HBA 24 "in the field" (i.e., during operation within a host system) due to external forces or factors (e.g., power failure during reprogramming of flash 56). In such circumstances, the microprocessor 52 will not operate properly and there is no way to reprogram the flash 56 so as to replace the corrupted program image, except by going out into the field and removing the HBA card 24 from its host system and reprogramming the flash memory 56 with a new program image.

Thus, in prior art systems, reprogramming of the nonvolatile memory 56 if the program image is bad (corrupted) requires a service technician or engineer to remove the nonvolatile memory 56 from the HBA 26 and, if the HBA 24 has been implemented in the field, to travel where the HBA 24 is located in order to reprogram the memory 56 and fix the problem. This is an inefficient process that unnecessarily wastes valuable human resources. Thus, there is a need for a method and system that allows a host device to perform direct and programmed accesses to the nonvolatile memory so as to be able to reprogram the nonvolatile memory within a HBA, without intervention and assistance from the microprocessor on the HBA.

Additionally, direct programmed access by a host device to nonvolatile memory without the assistance of the HBA microprocessor 52 can further increase the multi-tasking and efficiency of the overall system. As mentioned above, prior art automatic direct accesses by the host device during host "boot up" locked the PCI/X bus 22 until the access request was completely satisfied. However, the locking of the PCI/X bus during a programmed access by the Host is not efficient from a multi-tasking perspective. Therefore, the mechanism for performing automatic direct accesses by the host is not well-suited for performing direct programmed accesses by the host when multiple application programs running on the host desire access to the PCI/X bus 22. Therefore, for direct programmed accesses by the host it is desirable to provide registered (or buffered) read and/or write operations so that the PCI/X bus 22 can be free for other applications and requests, during a pending direct access to the nonvolatile memory.

BRIEF SUMMARY OF THE INVENTION

The present invention addresses the above and other needs by providing a method and system in which a host device (e.g., server) can perform direct programmed accesses to nonvolatile memory located on a peripheral device (e.g., HBA) without the assistance of a processor on the peripheral device that normally controls access to the nonvolatile memory. In other words, even if the processor on the peripheral device is not functioning properly or inoperable, the host device can still access the nonvolatile memory on the peripheral device.

In one embodiment of the invention, a peripheral device, operably coupled to a host device, includes one or more "host-direct-access" registers (also referred to herein as "host registers") that may be directly accessed by the host device, without intervention or assistance from processing circuitry (e.g., a microprocessor) that controls access to nonvolatile memory located on the peripheral device during normal operation of the peripheral device. After the host device stores desired address information in the host registers, controller circuitry located in the peripheral device accesses the nonvolatile memory in accordance with the address stored in the host registers by the host device to perform a desired read or write operation.

In a preferred embodiment, the host device is a server, the peripheral device is a HBA, the nonvolatile memory is a flash memory device, and the host registers include a read-address register, a read-data register; a read-next-data register; a write-address register, a write-data register and a control/status register to monitor and control the duration and status of direct read and write operations performed by the host server.

In a further embodiment, a method of providing direct host access to peripheral memory located on a peripheral device is initiated when host software writes to a read-address register to indicate a memory address from which data is to be read. The write of the address to the read-address register activates controller hardware, which retrieves the requested data. The retrieved data is then stored into a read-data register, from where the data is sent to the host via an appropriate bus interface (e.g., PCI/PCIX bus interface). The controller hardware also indicates when the data is valid. The host device reads the data from the data-read register and when a read data valid (RDV) bit is set in the register by the controller, this indicates that the data is valid and ready for use by the host.

In a further embodiment, the invention allows a host device to perform multiple direct reads from sequential addresses in peripheral memory located on a peripheral device. In this embodiment, the controller hardware also stores the data retrieved from flash 56 in a read-next-data register, as well as the read-data register used for a single reads. The host software reads from the read-next-data register or the read data register, and when the RDV is set, the data is valid and ready for use by the host software. Additionally, if the host software reads valid data in the read-next-data register, data from the next sequential address within the nonvolatile memory is then automatically retrieved as described above. The sequential read process continues storing retrieved data in the read data and read-next-data registers until the last sequential read is requested.

In a further embodiment, the invention allows a host device to perform direct writes to peripheral memory located on a peripheral device. In this embodiment, host software writes to a "write-address" register to indicate a memory address/destination where data is to be stored. Next, the host software writes to a write-data register with the desired data, or a portion thereof. Writing to the write-data register activates the memory access circuit, which thereafter executes a write operation.

DETAILED DESCRIPTION OF THE PREFERRED EMBODIMENTS

The invention is described in detail below with reference to the figures, wherein like elements are referenced with like numerals throughout. As discussed below, the invention is described in the context of a host server directly accessing nonvolatile flash memory on a HBA via a PCI/PCIX interface. However, it is understood that the invention is not limited to the embodiments described herein and that the principles of the invention may be utilized in other contexts, which can utilize different host devices, different peripheral devices, different memory devices, different bus/interface architectures, and/or different protocols. Those of ordinary skill in the art can readily recognize that the principles of the invention, as described herein, can be utilized in systems wherein it is desirable for a host device to directly access peripheral memory located on a peripheral device.

Figure 1:
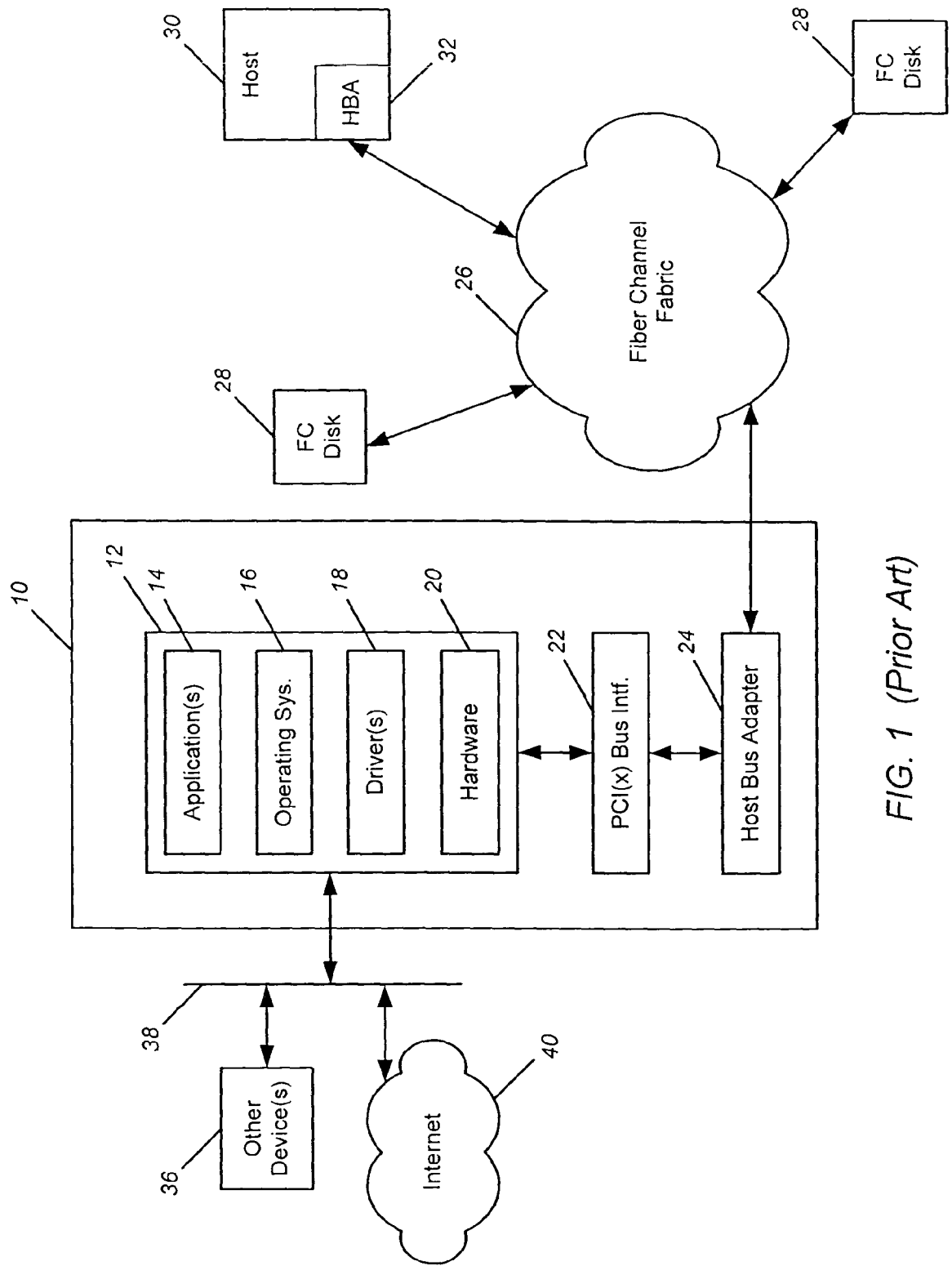
FIG. 1 illustrates a block diagram of prior art host system wherein a host server communicates with a HBA via PCI/PCIX bus interface.
Figure 2:
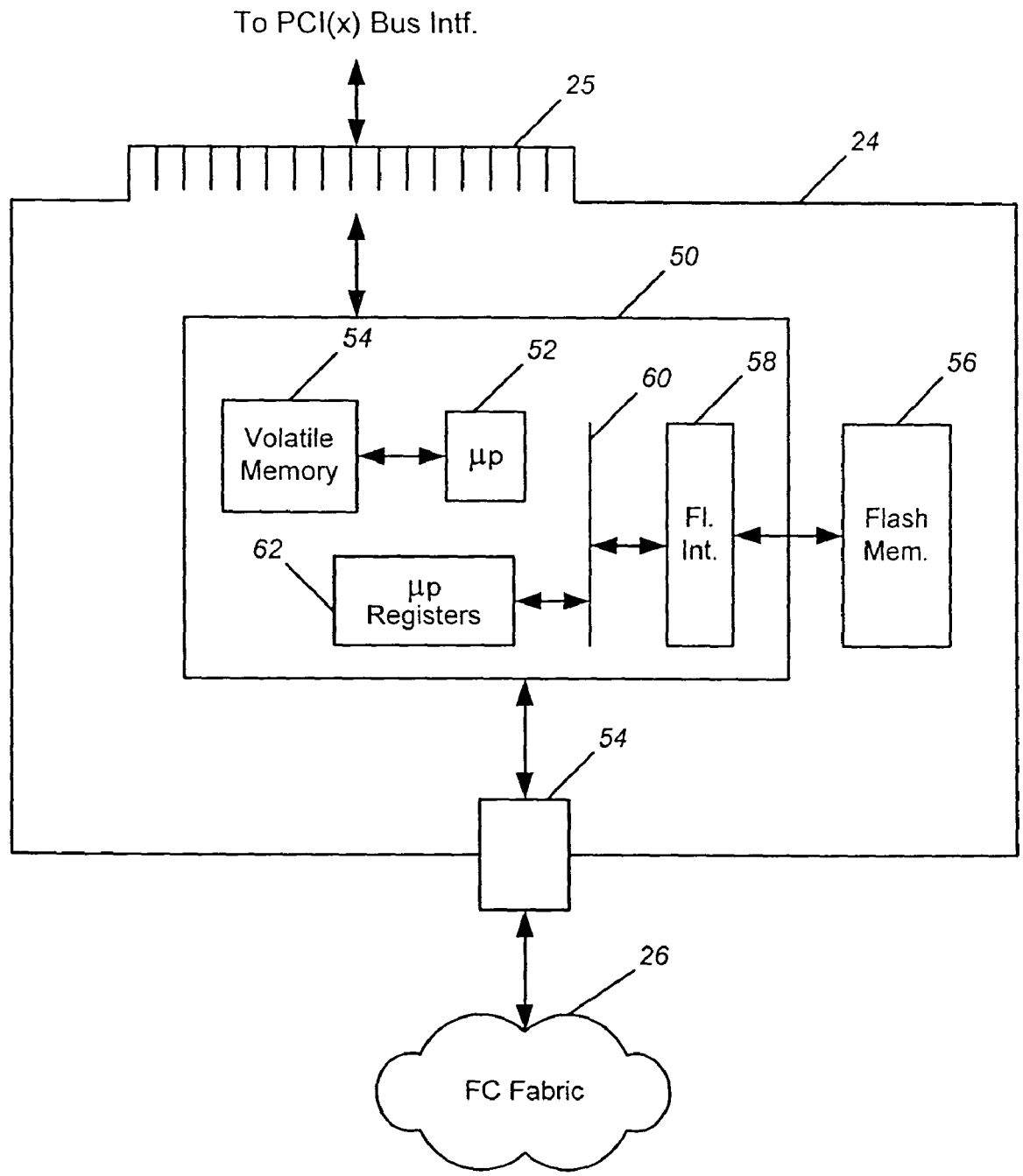
FIG. 2 illustrates a block diagram of a prior art HBA card.
Figure 4:
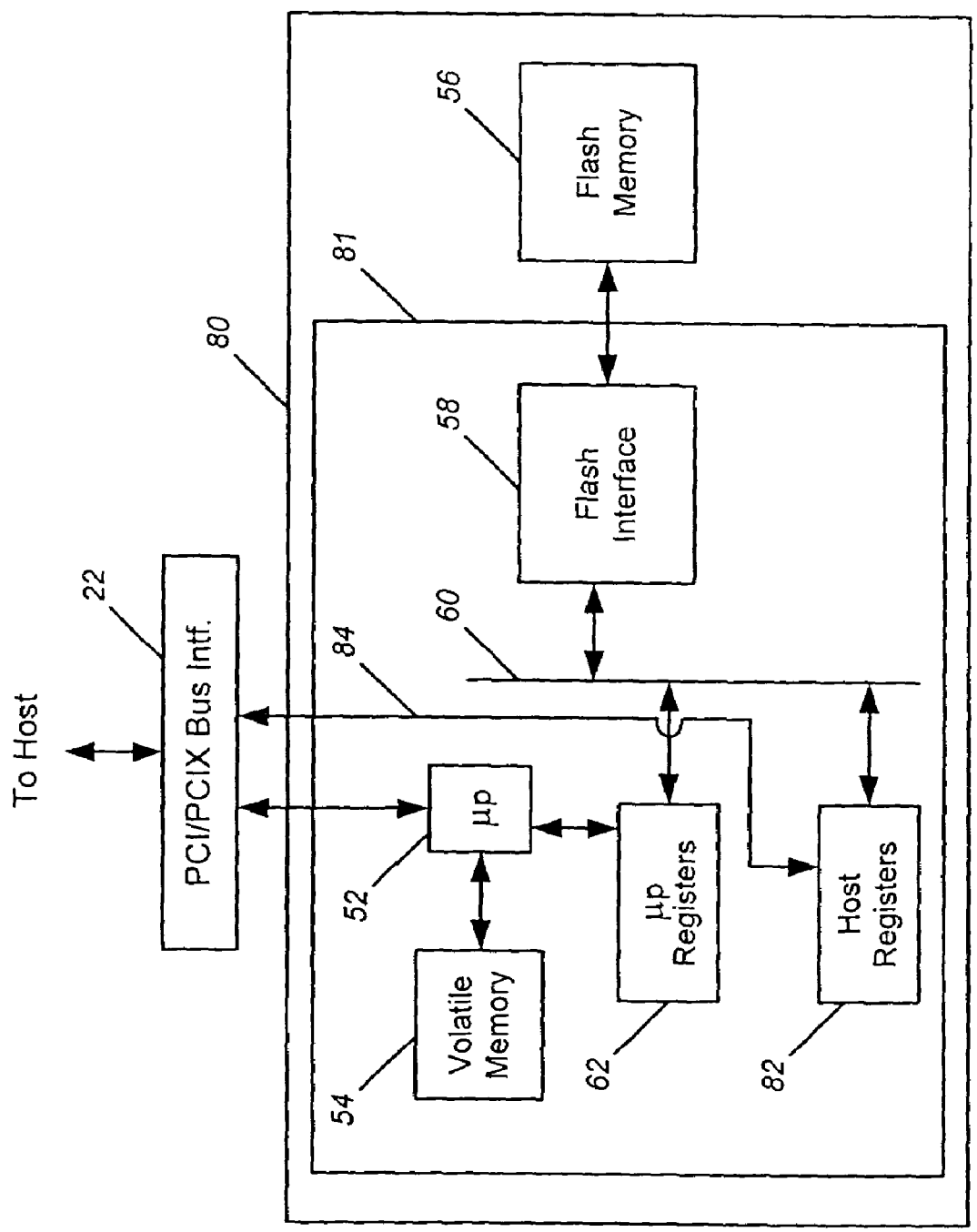
FIG. 4 illustrates a block diagram of an improved HBA card, in accordance with one embodiment of the invention.

FIG. 4 illustrates a block diagram of an improved HBA card 80, in accordance with one embodiment of the present invention. As discussed above, the primary function of an HBA 80 is to provide I/O management and operation offload to the host CPU so that the host server can be utilized for application data processing, rather than handling I/O operations. The HBA 80 is coupled to the host device via a PCI/PCIX bus interface 22, which is a well-known interface and protocol. The HBA 80 contains a flash controller 81, which includes a microprocessor 52 that executes programs/instructions and processes data (also referred to herein as a "program image") stored in a volatile memory 54 to perform its various functions. In one embodiment, the microprocessor 52 is a reduced instruction set computer (RISC) microprocessor that is responsible for all direct memory accesses (DMA) between the host memory and the HBA. The HBA controls these transfers to and from host memory without the need for the host CPU to be involved. In a further embodiment, the volatile memory 54 includes cache memory for storing "context information" (e.g., frame no., source, destination, etc.) for up to 2047 concurrent I/O operations. This cache memory can greatly improve the performance of the HBA 80. For example, if frames of data arriving from numerous storage devices 28 (FIG. 1) are interleaved, the HBA needs to have context information about the incoming data, such as frame information in order to process it. The cache memory stores the I/O context information needed for all pending I/Os, thereby making data retrieval for each frame of data very fast and transparent to the server CPU.

The HBA 80 further includes a flash memory 56 for storing the program image that is downloaded to the volatile memory 54 during HBA power up or wake up. Various types of flash memory devices, such as NAND and NOR flash memory devices are well-known in the art. The microprocessor 52 can further access the flash memory 56 on an "as needed" basis during operation of the HBA. Since the flash memory 56 is a nonvolatile memory, its contents will not be lost if power to the HBA is lost or turned off. Data is transferred between the volatile memory 54 and the flash memory 56 via the flash interface 58 and the flash interface bus 60. The operation and functionality of various types of flash interface circuits 58 and buses 60 that may be implemented in accordance with the present invention are well known in the art.

During HBA 80 wake-up or power-up, or whenever the microprocessor 52 desires to access the flash memory 56, information is retrieved from or written to the flash memory device 56 as follows. The microprocessor 52 writes to a μp register set 62 which activates appropriate circuitry within the flash interface 58 to retrieve the requested data or write data to a specified address location in the flash memory 56. In one embodiment, the μp register set 62 comprises a read-address register, a read-data register, a read-next-data register, a write-address register, a write-data register and a control/status register. In a further embodiment, each of the registers in the μp register set 62 comprises a plurality D-flip flops. The functionality of these registers is described in further detail below with respect to FIG. 5A. As discussed above, it is desirable and advantageous to allow the host device 12 (FIG. 1) to directly access (read and/or write to) the flash memory 56, without intervention or assistance by the microprocessor 52. For example, if the "program image" in the flash 56 is damaged and needs to be replaced, the microprocessor 52 may not be able to properly perform its normal read, write and erase operations. In such situations, it is desirable to be able to perform direct "programmed" access to the flash 56 by the host without assistance from the microprocessor 52. As discussed above, although automatic direct access protocols by the host during host "start up" are known in the art, these types of automatic accesses at system start up are not implemented to reprogram a damaged program image in the flash 56. Additionally, prior art automatic direct access by the host during host "boot up" locked the PCI/X bus until the boot access function is completed. Such automatic reads implemented by the host system read data via the PCI/X bus at an address it has previously assigned in a ROM Base Address Register (BAR) (not shown) within a channel of the HBA.

If the flash is currently being accessed by another requester (e.g., an HBA microprocessor 52), the HBA signals the host system to retry the access repeatedly until the flash 56 and data therein is available. The retry mechanism is automatic and the host system may include PCI/X bus hardware that eventually times out an access if the retries are excessive. In the meantime, however, the PCI/X bus interface is "locked" so that no other data transmissions are carried out while the "boot up" process is waiting to be completed. This "locking" of the PCI/X bus would not be efficient during normal programmed operation of the host computer when there may be multiple utility/application programs running on the host computer, each desiring access to the PCI/X bus 22. In order to address the deficiencies of prior art systems, in one embodiment of the invention, additional host registers 82 are implemented within the controller 81 of the HBA 80 for allowing programmed direct access to the flash 56 by the host device 12. These registers 82 are used by the host device 12 to directly access the flash memory 56, without intervention and assistance by the microprocessor 52. During host system 10 (FIG. 1) start-up and initialization, host software maps the host registers (data, address, etc.) to host configuration space which allows host software to read and write to the host-configured registers 82 via the PCI/PCIX interface 22 and a direct signal/data path 84. Additionally, the host registers 82 provide for "buffered" direct access by the host so that the PCI/X bus 22 may be free during pending direct host access requests to handle requests by other utility/application programs running on the host. The host configured registers 82 are also referred to herein as "host registers 82" and "host register set 82."

In a preferred embodiment, in order to directly access the flash 56, host software writes to the host register set 82 which activates appropriate hardware/circuitry within the controller 81 to retrieve the requested data or write data to a specified address location in the flash memory 56. In one embodiment, the host register set 82 comprises a read-address register, a read-data register, a read-next-data register, a write-address register, a write-data register and a control/status register. In a further embodiment, each of the registers in the host register set 62 comprises a plurality of D-flip flops. The functionality of these registers is described in further detail below with respect to FIG. 5B.

Host software that performs the various operations discussed herein can be easily implemented by those of ordinary skill in the art, without undue experimentation. Different types of nonvolatile memory devices, including different types of flash memory devices, have different algorithms and protocols for erase, read and write operations. Those of ordinary skill in the art can easily design and implement host software to function with these different algorithms and protocols, by utilizing the host register set 82 as described herein, in accordance with the preferred embodiments of the invention.

Figure 5B:
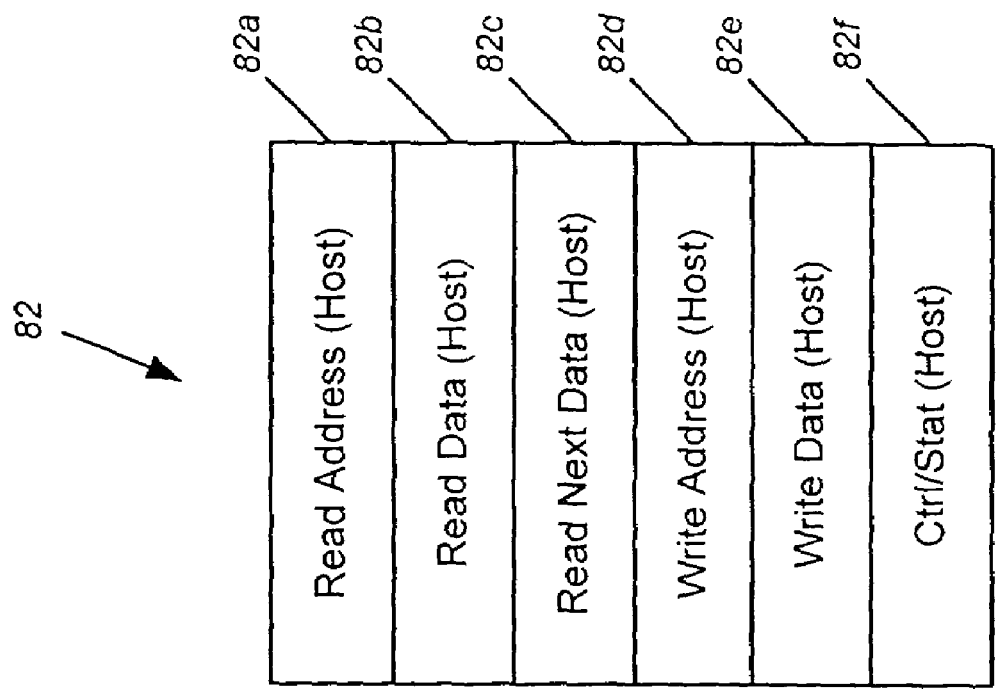
FIG. 5B illustrates a block diagram of a register set that is accessed by host software, in accordance with one embodiment of the invention.
Figure 5A:
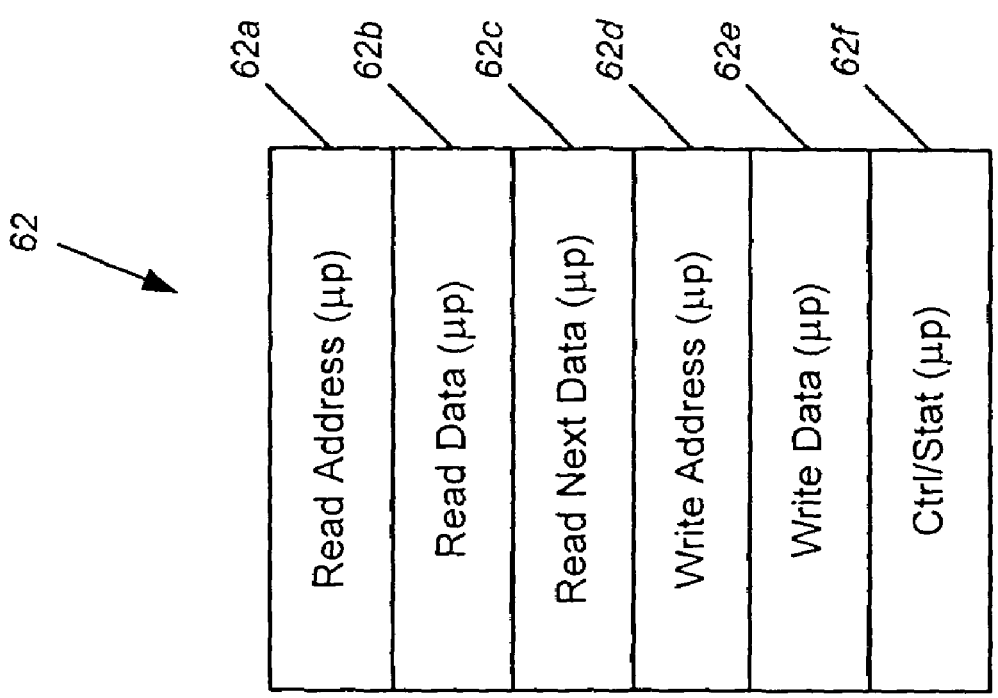
FIG. 5A illustrates a block diagram of a register set that is accessed by the microprocessor on the HBA cards of FIGS. 2 and 4.

FIGS. 5A and 5B illustrate various registers belonging to the μp register set 62 and the host register set 82, respectively, in accordance with one embodiment of the invention. Both register sets 62 and 82 include a read-address register 62a, 82a, a read-data register 62b, 82b, a read-next-data register 62c, 82c, a write-address register 62d, 82d, a write-data register 62e, 82e and a control/status register 62f, 82f. In this embodiment, the host register set 82 is identical with the μp register set 62. However, it is understood that different configurations of the register sets 62 and 82 may be implemented in accordance with the invention.

During a direct host-to-flash read operation, in accordance with one embodiment of the invention, host software writes to the host read address register 82a with an address in the flash 56 that contains the desired data to be read. The write of the address to the host read-address register 82a causes hardware/circuitry within the controller 81 to retrieve the requested data and store the data in host read-data register 82b. In one embodiment, hardware within the controller 81 fetches the data in 16-bit increments and assembles the data into 32 bit words in the host read-data register 82b, from where it is read by host software via the PCI/PCIX interface 22. The controller 81 hardware also indicates when the data is valid by setting a read data valid (RDV) bit in the read-data register 82b and the control/status register 82f. The host software repeatedly reads from the host read-data register 82b until the RDV bit indicates that the data stored in the register 82b is valid and ready for use by the host software.

In a preferred embodiment, host software initially requests access to the peripheral memory by setting a request bit in the control/status register 82f. Hardware and/or firmware within the controller 81 grants access to the host software by setting a grant bit in the control/status register 82f. Thereafter, the controller is configured to "sense" the status of the other host registers 82a–82e in order to perform direct read and write operations to the peripheral memory as requested by the host software. In one embodiment a multiplexer (not shown) is used to switch between the .mu.p registers 62 and the host registers 82 to control access to the nonvolatile memory by either the microprocessor 52 or the host device 12, respectively. A more detailed discussion of this multiplexing and arbitration protocol is provided in U.S. Pat. No. 7,062,615, entitled "Multi-Channel Memory Access Arbitration Method And System," concurrently filed and commonly owned with the present application for patent, the entirety of which is incorporated herein by reference.

Memory access control circuitry and techniques for accessing memory devices such as flash memory, for example, are well known in the art. Therefore, although all of the components of controller 81 (e.g., state machine, row and column address decoders, address and data buses, etc.) are not illustrated in FIG. 4, it is understood by those of ordinary skill in the art that the required controller hardware and/or firmware components are inherently present in controller 81 so as to enable the reading and writing of data to the flash memory 56 as described herein in accordance with the preferred embodiments of the invention.

In a further embodiment, multiple reads to sequential addresses within the flash 56 can be implemented by storing the retrieved data in the read-next-data register 82c, as well as the read-data register 82b. The host software repeatedly reads from the read-next-data register 82c and when the RDV is set, the data is valid and ready for use by the host software. When the host software reads the read-next-data register and RDV is set, the data from the next higher address location (i.e., next sequential address) within the flash 56 is then automatically retrieved as described above. The sequential read process continues storing retrieved data in the read-next-data register 82c until the last sequential read is performed, wherein the host software reads the last sequential data in the read-data register 82b, indicating the completion of the sequential read operation.

In another aspect of the invention, direct host-to-flash write operation can be performed. First, the host software writes a desired address into a write-address register 82d. The host software also writes desired data into the write-data register 82e, which causes the controller 81 to execute a write operation to the specified address in the flash 56. As discussed above, flash controllers and associated hardware are well known in the art. The execution of write operations using various control signals (e.g., chip enable, write enable, etc.) and protocols are also well known in the art.

Figure 3:
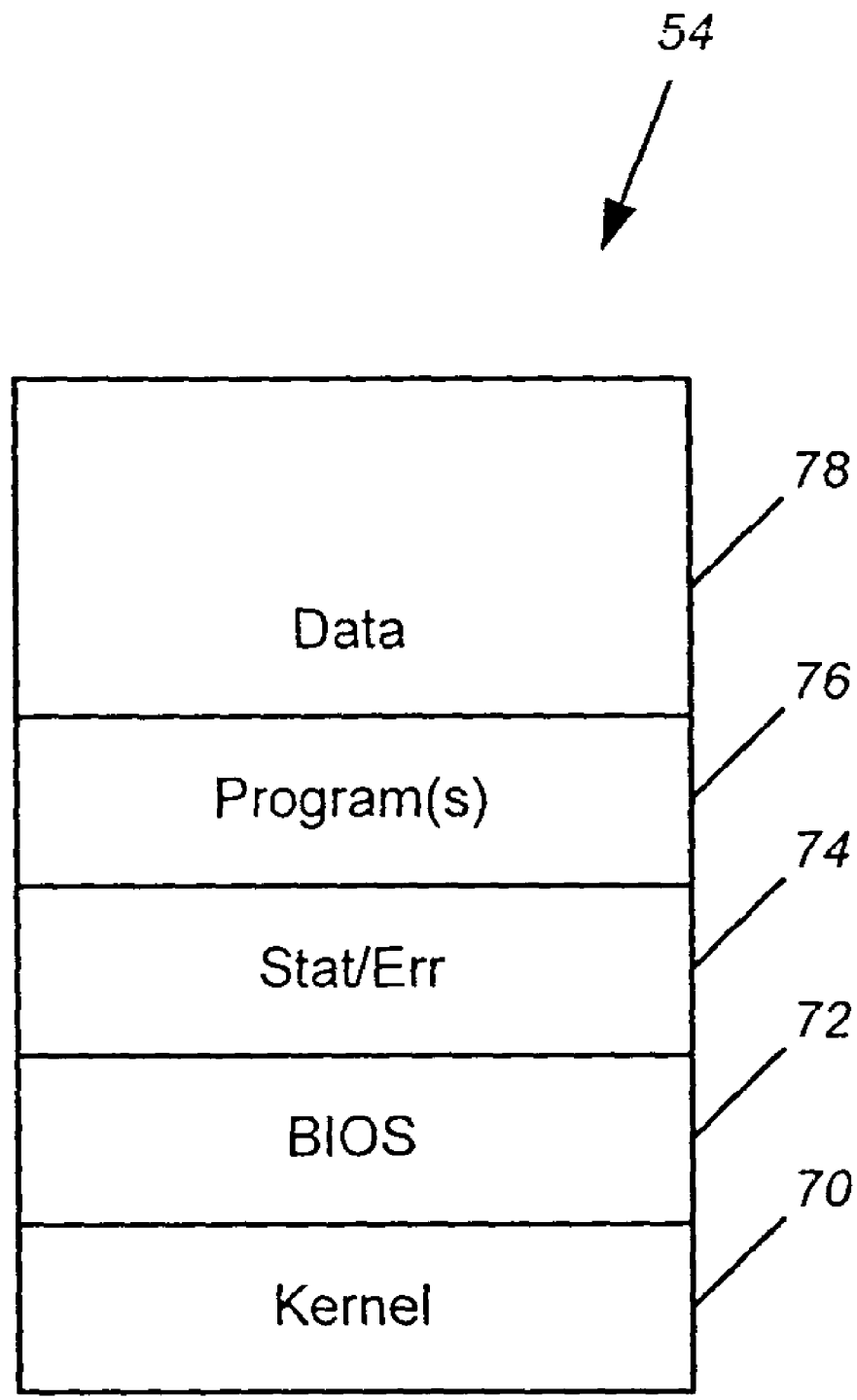
FIG. 3 illustrates a block diagram of typical program modules contained within a program image that is executed by a microprocessor on the HBA card of FIG. 2.

As mentioned above, in one embodiment, the μp registers 62 are identical to the host registers 82. Therefore, the functionality of μp registers 62 is identical to the functionality of the host registers 82, as discussed above, except it is the microprocessor 52 rather than the host 12 that accesses the flash 56. When the microprocessor 52 accesses the flash memory 56, the microprocessor 52 reads and writes to the μp registers 62, in accordance with a software program 76 (FIG. 3) stored in the volatile memory 54 and executed by the microprocessor 52, in a similar fashion to that discussed above with the host registers 82.

As described above, the invention provides a method and system for allowing a host device to directly access peripheral memory (e.g., flash) on a peripheral device (e.g., HBA), without intervention or assistance by a processor located on the peripheral device. Those of ordinary skill in the art will appreciate that the above descriptions of the preferred embodiments are exemplary only and that the invention may be practiced with modifications or variations of the techniques disclosed above. Those of ordinary skill in the art will know, or be able to ascertain using no more than routine experimentation, many equivalents to the specific embodiments of the invention described herein. Such modifications, variations and equivalents are contemplated to be within the spirit and scope of the present invention as set forth in the claims below.

What is claimed is:

1. A method of providing programmed direct access to peripheral memory located on a peripheral device including a microprocessor and controller circuitry by a host device, via a bus interface, comprising:
   writing an address to a host-configured address register located on the peripheral device, wherein the address is generated and transmitted by host software executed by the host device via the bus interface; and
   accessing the peripheral memory at a location corresponding to the address written in the host address register by the controller circuitry without burdening the microprocessor, wherein said accessing does not occur as part of an automatic access to the peripheral memory during host device start up.

2. The method of claim 1 wherein said bus interface is not locked if said act of accessing is waiting for other access requests to the peripheral memory to be completed.

3. The method of claim 1 wherein said act of accessing comprises:
   retrieving data from said location corresponding to said address;
   storing the retrieved data in a host-configured data register located on said peripheral devices, by the peripheral device's controller circuitry; and
   reading the retrieved data from the host-configured data register so as to transmit the data directly to said host device, wherein the read operation is performed by said host software.

4. The method of claim 3 further comprising:
   retrieving additional data from a next sequential address location within said peripheral memory;
   storing the additional data in said host-configured data register;
   reading the additional data from the host-configured data register so as to transmit the data directly to said host device; and
   repeating the steps of retrieving, storing and reading additional data until data from a last sequential data address is retrieved, stored and read, wherein said read operations are performed by said host software.

5. The method of claim 1 wherein said act of accessing comprises:
   writing data to a host-configured write register located on said peripheral device, wherein the data is transmitted by said host software executed by said host device; and;
   writing the data to said location in said peripheral memory, wherein controller circuitry within the peripheral device writes the data to the peripheral memory without burdening the microprocessor.

6. The method of claim 1 wherein said host device comprises a server, said peripheral device comprises a host bus adapter card, said peripheral memory comprises a flash memory device, and said bus interface comprises a PCI/PCIX bus interface.

7. A method of providing a host device programmed direct access to peripheral memory located on a peripheral device including a microprocessor and controller circuitry, comprising:
   mapping a plurality of registers to host configuration space so as to allow host software executed by the host device to read and write to the plurality of registers, wherein the plurality of registers are located on the peripheral device and comprises an address register and a data register; and
   writing a desired address in the address register, wherein the host software generates the desired address and writes it in the address register, thereby causing controller circuitry within the peripheral device to automatically access the peripheral memory at a location corresponding to the desired address without burdening the microprocessor, wherein said act of writing occurs after host device start operations have been completed.

8. The method of claim 7 wherein said controller circuitry automatically retrieves data stored at said location in peripheral memory and stores the data in said data register, the method further comprising reading the data from the data register by said host software.

9. The method of claim 7 further comprising writing data to said data register, thereby causing said controller circuitry to automatically store the data in said peripheral memory at said location without burdening the microprocessor.

10. A system for providing direct host device access comprising:
   a host device comprising host software and being configured to execute said software:

a peripheral device further comprising:
  a peripheral memory;
  a microprocessor connected to the peripheral memory;
  means for writing an address to a host-configured address register located on the peripheral device, wherein the address is generated and transmitted by the host software executed by the host device after host device start up operations are completed; and
  a controller circuitry connected to the peripheral memory configured for accessing the peripheral memory at a location corresponding to the address written in the host address register without burdening the microprocessor.

11. The system of claim 10 wherein said means for accessing comprises:
  means for retrieving data from said location corresponding to said address;
  means for storing the retrieved data in a host-configured data register located on said peripheral device; and
  means for reading the retrieved data from the host-configured data register so as to transmit the data directly to said host device, wherein the read operation is performed by said host software.

12. The system of claim 11 further comprising:
  means for retrieving additional data from a next sequential address location within said peripheral memory;
  means for storing the additional data in said host-configured data register;
  means for reading the additional data from the host-configured data register so as to transmit the data directly to said host device; and
  means for repeating the steps of retrieving, storing and reading additional data until data from a last sequential data address is retrieved, stored and read, wherein said read operations are performed by said host software.

13. The system of claim 10 wherein means for accessing comprises:
  means for writing data to a host-configured write register located on said peripheral device, wherein the data is transmitted by said host software executed by said host device; and;
  means for writing the data to said location in said peripheral memory, wherein controller hardware within the peripheral device writes the data to the peripheral memory.

14. The system of claim 10 wherein said host device comprises a server, said peripheral device comprises a host bus adapter card, said peripheral memory comprises a flash memory device, and said means for writing and said means for accessing comprise a PCI/PCIX bus interface.

15. A computer readable storage device, for storing computer-executable instructions that when executed perform a method of providing a host device programmed direct access to peripheral memory located on a peripheral device including a microprocessor and control circuitry, the method comprising:
  mapping a plurality of registers to host configuration space so as to allow host software executed by the host device to read and write to the plurality of registers, wherein the plurality of registers are located on the peripheral device and comprises an address register and a data register; and
  writing a desired address in the address register, wherein the host software generates the desired address and writes it in the address register, thereby causing the controller circuitry within the peripheral device to automatically access the peripheral memory at a location corresponding to the desired address without burdening the microprocessor, wherein said writing occurs after start up operations for said host device have been completed.

16. The computer-readable storage device of claim 15 wherein said controller circuitry retrieves data stored at said location in peripheral memory and stores the data in said data register, and said method further comprises reading the data from the data register by said host software.

17. The computer-readable storage device of claim 15 wherein said method further comprises writing data to said data register, thereby causing said controller circuitry to store the data in said peripheral memory at said location without burdening the microprocessor.

* * * * *

UNITED STATES PATENT AND TRADEMARK OFFICE
CERTIFICATE OF CORRECTION

PATENT NO. : 7,149,823 B2 Page 1 of 1
APPLICATION NO. : 10/651887
DATED : December 12, 2006
INVENTOR(S) : Eddie Miller et al.

It is certified that error appears in the above-identified patent and that said Letters Patent is hereby corrected as shown below:

On the title page, item [73] should read.
(73) Assignee: Emulex Design & Manufacturing Corporation Signed and Sealed this Third Day of June, 2008

JON W. DUDAS
*Director of the United States Patent and Trademark Office*